(12) United States Patent
Boucké

(10) Patent No.: US 12,345,056 B2
(45) Date of Patent: Jul. 1, 2025

(54) DECORATIVE PANEL, AND DECORATIVE FLOOR COVERING CONSISTING OF SAID PANELS

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 205 days.

(21) Appl. No.: 17/774,985

(22) PCT Filed: Nov. 6, 2020

(86) PCT No.: PCT/EP2020/081371
§ 371 (c)(1),
(2) Date: May 6, 2022

(87) PCT Pub. No.: WO2021/089835
PCT Pub. Date: May 14, 2021

(65) Prior Publication Data
US 2022/0381042 A1   Dec. 1, 2022

(30) Foreign Application Priority Data
Nov. 8, 2019   (NL) ...................................... 2024192

(51) Int. Cl.
*E04F 15/08*       (2006.01)
*B32B 3/06*        (2006.01)
(Continued)

(52) U.S. Cl.
CPC ................ *E04F 15/08* (2013.01); *B32B 3/06* (2013.01); *B32B 5/02* (2013.01); *B32B 5/18* (2013.01);
(Continued)

(58) Field of Classification Search
CPC ... E04F 15/08; E04F 13/0866; E04F 13/0894; E04F 13/14; E04F 15/02038;
(Continued)

(56) References Cited

U.S. PATENT DOCUMENTS

| | | |
|---|---|---|
| 10,508,457 B2 | 12/2019 | Hannig et al. |
| 2005/0208275 A1* | 9/2005 | Abe ........................ B32B 27/20 |
| | | 428/195.1 |

(Continued)

FOREIGN PATENT DOCUMENTS

| | | |
|---|---|---|
| CA | 2131022 A1 | 7/1994 |
| CN | 106499145 A | 3/2017 |

(Continued)

OTHER PUBLICATIONS

Ioannou et al., Capillary Absorption of Water and N-Decane by Autoclaved Aerated Concrete, Cement and Concrete Research, vol. 38, Issue 6, Jun. 2008, obtained from https://www.sciencedirect.com/science/article/pii/S0008884608000409 (Year: 2008).*

(Continued)

*Primary Examiner* — Theodore V Adamos
(74) *Attorney, Agent, or Firm* — The Webb Law Firm (57) ABSTRACT

Decorative panel, in particular a floor panel, ceiling panel or wall panel, including a core layer having an upper side and a lower side, a decorative top layer connected to said upper side of the core layer, a first panel side edge including a first coupling profile, and a second panel side edge including a second coupling profile designed to interconnect with a first coupling profile of a second, identical panel, both in horizontal direction and in vertical direction. The core layer includes a layer of foam concrete which is constituted by a matrix of concrete material in which air pockets in the form of cells are present.

22 Claims, 3 Drawing Sheets

(51) Int. Cl.

| | |
|---|---|
| *B32B 5/02* | (2006.01) |
| *B32B 5/18* | (2006.01) |
| *B32B 5/24* | (2006.01) |
| *B32B 7/12* | (2006.01) |
| *B32B 21/00* | (2006.01) |
| *B32B 21/04* | (2006.01) |
| *B32B 27/06* | (2006.01) |
| *B32B 27/08* | (2006.01) |
| *B32B 27/30* | (2006.01) |
| *B32B 27/32* | (2006.01) |
| *B32B 27/40* | (2006.01) |
| *C04B 12/00* | (2006.01) |
| *C04B 38/00* | (2006.01) |
| *C04B 38/06* | (2006.01) |
| *E04F 13/08* | (2006.01) |
| *E04F 13/14* | (2006.01) |
| *E04F 15/02* | (2006.01) |
| *E04F 15/10* | (2006.01) |
| *C04B 111/00* | (2006.01) |

(52) U.S. Cl.
CPC ............... *B32B 5/245* (2013.01); *B32B 7/12* (2013.01); *B32B 21/00* (2013.01); *B32B 21/047* (2013.01); *B32B 27/065* (2013.01); *B32B 27/08* (2013.01); *B32B 27/40* (2013.01); *C04B 12/007* (2021.05); *C04B 38/0061* (2013.01); *C04B 38/0067* (2013.01); *C04B 38/06* (2013.01); *E04F 13/0866* (2013.01); *E04F 13/0894* (2013.01); *E04F 13/14* (2013.01); *E04F 15/02038* (2013.01); *E04F 15/107* (2013.01); *B32B 27/306* (2013.01); *B32B 27/32* (2013.01); *B32B 2255/10* (2013.01); *B32B 2262/062* (2013.01); *B32B 2262/101* (2013.01); *B32B 2262/106* (2013.01); *B32B 2266/049* (2016.11); *B32B 2266/08* (2013.01); *B32B 2307/72* (2013.01); *B32B 2307/7265* (2013.01); *B32B 2307/732* (2013.01); *B32B 2607/00* (2013.01); *C04B 2111/00612* (2013.01); *E04F 2201/0146* (2013.01); *E04F 2201/0153* (2013.01); *E04F 2201/023* (2013.01); *E04F 2201/043* (2013.01)

(58) Field of Classification Search
CPC .. E04F 15/107; C04B 12/007; C04B 38/0061; C04B 38/0067; C04B 38/06; B32B 3/06; B32B 5/02; B32B 5/18; B32B 5/245; B32B 7/12; B32B 21/00; B32B 27/065; B32B 27/08; B32B 27/40
See application file for complete search history.

(56) References Cited

U.S. PATENT DOCUMENTS

| | | | |
|---|---|---|---|
| 2014/0272216 A1 | 9/2014 | Deo et al. | |
| 2019/0284804 A1 | 9/2019 | Ibrahim et al. | |
| 2019/0367716 A1* | 12/2019 | Hannig | .................. B32B 27/32 |

FOREIGN PATENT DOCUMENTS

| | | | | |
|---|---|---|---|---|
| CN | 106856662 A | | 6/2017 | |
| CN | 207728098 U | | 8/2018 | |
| DE | 19848154 A1 | * | 4/2000 | ............. B32B 13/14 |
| EP | 1992597 A1 | | 11/2008 | |
| EP | 3130462 A1 | * | 2/2017 | ............. B32B 27/32 |
| EP | 3456900 A1 | | 3/2019 | |
| JP | S60188719 U | | 12/1985 | |
| JP | S61121181 U | | 7/1986 | |
| JP | H3016805 U | | 7/1995 | |
| JP | 200158888 A | | 3/2001 | |
| JP | 200426597 A | | 1/2004 | |
| JP | 201065426 A | | 3/2010 | |
| JP | 201816958 A | | 2/2018 | |
| JP | 2019190272 A | | 10/2019 | |
| TW | 201537005 A | | 10/2015 | |
| WO | WO-2015130169 A1 | * | 9/2015 | ........ E04F 15/02038 |
| WO | WO-2016091819 A1 | * | 6/2016 | ........ E04F 15/02038 |
| WO | 2019137964 A1 | | 7/2019 | |

OTHER PUBLICATIONS

Mishra, Gopal, Aerated Concrete & Its Properties, https://theconstructor.org/concrete/aerated-concrete-its-properties/6736/, published Jan. 3, 2013 from https://web.archive.org/web/20130103052253/https://theconstructor.org/concrete/aerated-concrete-its-properties/6736/ (Year: 2013).*

Xu et al., Utilizing Wood Fiber Produced With Wood Waste to Reinforce Autoclaved Aerated Concrete, Construction and Building Materials, vol. 208, May 30, 2019, pp. 242-249, obtained from https://www.sciencedirect.com/science/article/pii/S0950061819305094 (Year: 2019).*

Downton, Paul, Autoclaved Aerated Concrete, 2013, obtained from https://www.yourhome.gov.au/materials/autoclaved-aerated-concrete (Year: 2013).*

Tureng German English dictionary, Definition of Porenbeton, https://tureng.com/en/german-english/porenbeton, obtained on Feb. 18, 2025 (Year: 2025).*

"ALC (Autoclaved Lightweight Concrete)", Ceramics, 2008, vol. 43(2).

* cited by examiner

DECORATIVE PANEL, AND DECORATIVE FLOOR COVERING CONSISTING OF SAID PANELS

CROSS-REFERENCE TO RELATED APPLICATIONS

This application is the United States national phase of International Application No. PCT/EP2020/081371 filed Nov. 6, 2020, and claims priority to The Netherlands Patent Application No. 2024192 filed Nov. 8, 2019, the disclosures of which are hereby incorporated by reference in their entirety.

BACKGROUND OF THE INVENTION

Field of the Invention

The invention relates to a panel, in particular a decorative panel, a floor panel, a ceiling panel or a wall panel. The invention also relates to a floor covering consisting of a plurality of mutually coupled panels.

Description of Related Art

In the field of decorative floor coverings, decorative panels are known having a MDF (Medium Density Board) or HDF (High Density Board) based core layer on top of which a decorative substrate is attached to provide the panels a desired appearance. A major disadvantage of these known panels is the hygroscopic nature of the core layer, which affects the lifetime and durability of such panels. For this reason, the traditional MDF/HDF based panels are more and more replaced by polyvinyl chloride (PVC) based panels, also provided with a decorative substrate on top. These PVC based panels have the advantage over of being relatively waterproof compared to MDF/HDF based panels.

The drawback, however, of these PVC based panels is that the temperature resistance is very poor, as a result of which these panels will typically easily deform (curve) in case these panels are exposed to a heating source, like a heating radiator or even a lamp. Moreover, a common additional important drawback of both the MDF/HDF based panels and the PVC based panels is the flammability of these panels. Flammability of furniture is of concern as, for example, cigarettes and candle accidents can easily trigger domestic fires.

Hence, there is a general need in the field of decorative flooring to further develop decorative panels to counteract at least one of the above drawbacks, and in particular to develop a decorative panel which is relatively fireproof. There is an additional need to develop a decorative panel having an improved dimensional stability when subjected to temperature fluctuations during regular use.

Furthermore, in view of their practical use, it is a general requirement that the panels should have satisfactory—and preferably excellent—properties with regard to thermal insulation, sound absorption and compressive strength.

SUMMARY OF THE INVENTION

In the above context, it is an objective of the invention to meet the general needs and requirements addressed above, either in part or fully.

The above objective of the invention, is met by the provision of a decorative panel, in particular a floor panel, ceiling panel or wall panel, comprising:
 a core layer having an upper side and a lower side,
 a decorative top layer connected to said upper side of the core layer,
 a first panel side edge comprising a first coupling profile, and a second panel side edge comprising a second coupling profile designed to interconnect with a first coupling profile of a second, identical panel, both in horizontal direction and in vertical direction,
 wherein the core layer comprises a layer of foam concrete which is constituted by a matrix of concrete material in which air pockets in the form of cells are present.

When used as a part of a core layer in a panel according to the invention, the layer of foam concrete imparts several advantages to the panel, notably:
 A reduction of thermal conductivity, and hence an increase in thermal isolation
 A sufficient compressive strength
 A relatively light-weight panel
 Adequate sound absorption properties
 Excellent fire resistance
 Sufficient dimensional stability of the panel against freeze/thaw cycles
 Good workability with regard to cutting and profiling of side edges with woodworking tools.

The above listed advantages are further enhanced by some of the preferred embodiments that are presented below.

With regard to the basic design of the panel according to the invention, it is preferred the panel is flat and has a rectangular contour, comprising four side edges. Furthermore it is preferred that in the panel the first and second panel side edges are opposed side edges of the panel.

Such type of panels are most practical when creating a floor, ceiling or wall covering by interconnecting a multitude of such panels.

Preferably, in the panel according to the invention,
 either the cells in the foam concrete make up 60 to 85 vol. % of the total volume of the foam concrete, or
 the density of the foam concrete is in the range of 400 to 800 kg/m3.

Such a panel is effectively light-weight, and was proven to achieve a satisfactory sound absorption and thermal isolation.

In the panel according to the invention, it is preferred that the cells are for the major part of a closed cell type, the major part being preferably at least 80%, most preferably at least 90% of the cells.

Such a panel has a sufficient dimensional stability against freeze/thaw cycles, because any hydrated water vaporized from the concrete matrix and condensed in a closed cell as water is not able to accumulate with water in other cells. Hence, the water content in any of the individual cells of the foam concrete is kept low so that the risk of structural damage during freeze/thaw cycles is kept at a minimum.

Furthermore, in the panel according to the invention, the major part of the cells in the foam concrete are of a size which is sufficiently small to absorb water by capillary action.

Such a panel having an foam concrete layer with relatively small cells, was found to have a good workability and compressive strength.

The foam concrete may also be referred to as aerated concrete, as autoclaved cellular concrete (ACC) as aerated autoclaved concrete (AAC), and/or as autoclaved light-weight concrete (ALC).

It is in general preferred that the foam concrete in the panel according to the invention, has been obtained by autoclaving a concrete material at high temperature and pressure.

This process of autoclaving concrete material, proved to result in the provision of an foam concrete material that is highly suitable for use in a core layer of a panel.

With respect to the concrete material that forms a matrix in the foam concrete layer of the panel according to the invention, it is preferred that the concrete material comprises a mixture of particulate material and a cement as a binder.

In respect of the above concrete material, it is in particular preferred that:
the cement is calcium based i.e. a mineral compound comprising calcium oxide and/or calcium hydroxide, and/or calcium silicate based, i.e. a mineral compound comprising calcium oxide and/or calcium hydroxide with silicates in addition.
the cement is a calcium silicate hydrate mineral, such as Tobermorite, i.e. $Ca_5Si_6O_{16}(OH)_2·4H_2O$ or $Ca_5Si_6(O,OH)_{18}·5H_2O$.
the particulate material comprises sand, pulverized fuel ash, fly ash, lime, and/or aluminium (oxide) powder.
the particulate material comprises cellulose based particles, preferably lignocellulose based particles such as wood particles.

During production of the foam concrete, the (still unfoamed) concrete is mixed and cast in forms, several chemical reactions take place that gives the foam concrete its light weight (typically 20% of the weight of concrete) and thermal properties. Aluminium powder reacts with calcium hydroxide and water to form hydrogen. The hydrogen gas foams and doubles the volume of the raw mix creating gas bubbles up to 3 millimetres in diameter. At the end of the foaming process, the hydrogen escapes into the atmosphere and is replaced by air.

It is furthermore preferred that at least a part of the above cellulose based particles that are included in the particulate material, is formed by fibres.

Additional or alternative particulate material that may be included in the concrete material are so-called cementitious materials, including ground granulated blast furnace slag, silica fume, natural pozzolans, metakaolin, and calcined shale or clay.

The cellulose based particles in the form of wood particles, may be wood powder, wood shavings, wood wool, and/or wood chips. Instead of wood, another source of natural fibres may be used, such as hemp.

In a preferred embodiment, the core comprises at least one reinforcement layer, such as a textile layer, a cellulose layer, in particular a paper layer, a carbon fibre layer and/or a glass fibre layer. The reinforcement layer may be a woven or non-woven layer. In a more preferred embodiment, the core comprises at least two foam concrete layers, wherein at least one reinforcement layer is situated in between two foam concrete layers. It is conceivable that at least one reinforcement layer is integrated within one or more foam concrete layers and/or may subdivide a foam concrete layer into two (virtual) foam concrete (sub)layers. It is imaginable that the foam concrete is partially or entirely permeating holes formed in the reinforcement layer.

Preferably, in the panel according to the invention, a reinforcement layer is included in the core layer.

The reinforcement layer further enhances the stability of the panel against bending or sudden impact on a small surface area of the panel. The at least one reinforcement layer is preferably a non-woven layer or woven layer, in particular a cloth, for example made by fiberglass, and may have a thickness of 0.2-0.4 mm. The reinforcement layer may comprise natural fibers, such as jute, or alternatively the reinforcement layer comprises synthetic fibers, in particular polymer fibers, such as nylon fibers.

The reinforcement layer is preferably a planar structure that has a plane of orientation substantially parallel to the core layer.

It is further preferred that the core layer of the panel according to the invention, comprises at least 50% by weight, preferably in between 50 and 90% by weight, of foam concrete. Furthermore, it is preferred that the core layer comprises between 1 and 10% by weight of reinforcement layer.

Advantageously, the panel according to invention comprises a waterproof layer which is situated between the core layer and the top layer, preferably in the form of a waterproof adhesive that adheres the top onto the core layer.

As such, the core layer of the panel is further protected from humidity that is present in ambient air, and possibly enters via the top layer. The waterproof layer may be a polymer, or a synthetic or natural resin. The waterproof adhesive may for instance be a two-component glue, or a hot melt adhesive.

Preferably, in the panel according to the invention, the top layer comprises at least one decorative layer and at least one transparent wear layer covering said decorative layer.

A suitable wear layer in this context, has a melting temperature of above 100 degrees Celsius, and is preferably made of polyurethane.

The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities.

The decorative top layer is preferably a printed decorative top layer. This means that a printed decorative image of the top layer is realized by painting and/or (ink jet) printing, in particular digital printing. The decorative image may be printed directly on top of the core. However, it is typically more preferred that the printed decorative layer comprises a base layer or film, in particular a thermoplastic base layer or thermoplastic film, onto which a decorative image is printed. Prior to or subsequently to the printing step, the base layer is attached, directly or indirectly, to the core, e.g. by means of fusing or gluing.

The decorative top layer is preferably only covering at least a part of the upper side of the core layer, Side walls and the rear surface of the core are preferably substantially free of said decorative top layer.

The panel according to the invention comprises preferably a backing layer attached to a lower side of the core layer. The backing layer has a protective and adaptive function on the lower side of the core layer, especially when the panel is placed in contact with an underlying surface in order to form a floor, a ceiling or a wall covering.

The backing layer is preferably made of a flexible material, such as an elastomer. The thickness of the backing layer typically varies from about 0.1 to 2.5 mm. Suitable materials for the backing layer include polyethylene, cork, polyurethane and ethylene-vinyl acetate.

Furthermore, the panel according to the invention has a thickness between 3 and 10 mm, preferably in between 4 and 8 mm, which renders it most suitable for its intended use.

The core layer of the panel according to the invention preferably has a thickness of at least 3 mm, preferably at least 4 mm, and still more preferably at least 5 mm.

In regard of the coupling profiles of the panel according to the invention, it is preferred that the first coupling profile comprises:
- an upward tongue,
- at least one upward flank lying at a distance from the upward tongue,
- an upward groove formed in between the upward tongue and the upward flank wherein the upward groove is adapted to receive at least a part of a downward tongue of a second coupling profile of an identical panel, and
- preferably at least one first locking element, preferably provided at a distant side of the upward tongue facing away from the upward flank, and the second coupling profile comprises:
- a first downward tongue,
- at least one first downward flank lying at a distance from the downward tongue,
- a first downward groove formed in between the downward tongue and the downward flank, wherein the downward groove is adapted to receive at least a part of an upward tongue of a first coupling profile of a second, identical panel, and
- preferably at least one second locking element adapted for co-action with a first locking element of the second, identical panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition.

It is further within the realm of the invention that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling part is inserted in the upward groove of the first coupling part, such that the downward tongue is clamped by the first coupling part and/or the upward tongue is clamped by the second coupling part.

Preferably, the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank. In this way a "closed-groove" coupling or an "open-groove" coupling can be realized between panels, dependent on the inclination direction of the insides of the upward tongue and downward tongue.

Further in regard of the coupling profiles of the panel according to the invention, it is preferred that the panel comprises at least one third coupling profile and at least one fourth coupling profile located respectively at a third panel edge and a fourth panel edge, wherein the third coupling profile comprises:
- a sideward tongue extending in a direction substantially parallel to the upper side of the core,
- at least one second downward flank lying at a distance from the sideward tongue, and
- a second downward groove formed between the sideward tongue and the second downward flank, wherein the fourth coupling profile comprises:
- a third groove configured for accommodating at least a part of the sideward tongue of the third coupling profile of a second identical panel, said third groove being defined by an upper lip and a lower lip, wherein said lower lip is provided with an upward locking element,
- wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel.

Preferably wherein at least a part of each coupling profile is integrally formed with the core. It is imaginable that the coupling profiles are entirely formed by profiling the edges of the core.

The invention also relates to a decorative covering, in particular a decorative floor covering, decorative ceiling covering, or decorative wall covering, comprising a plurality of mutually coupled decorative panels according to the invention. The covering may also be suitable for installation at vertical corners, such as at inside corners of intersecting walls, pieces of furniture, and at outside corners, such as at entry ways.

Further embodiments of the invention are presented in the following non-limitative set of clauses:

1. Decorative panel, in particular a floor panel, ceiling panel or wall panel, comprising:
   - a core layer having an upper side and a lower side,
   - a decorative top layer connected to said upper side of the core layer,
   - a first panel side edge comprising a first coupling profile, and a second panel side edge comprising a second coupling profile designed to interconnect with a first coupling profile of a second, identical panel, both in horizontal direction and in vertical direction,
   - wherein the core layer comprises a layer of foam concrete which is constituted by a matrix of concrete material in which air pockets in the form of cells are present.

2. Panel according to clause 1, being flat and having a rectangular contour, comprising four side edges.

3. Panel according to clause 1 or 2, wherein the first and second panel side edges are opposed side edges of the panel.

4. Panel according to one of the preceding clauses, wherein
either the cells in the foam concrete make up 60 to 85 vol. % of the total volume of the foam concrete, or
the density of the foam concrete is in the range of 400 to 800 kg/mm3.

5. Panel according to clause 4, wherein the cells are for a major part of a closed cell type, the major part being preferably at least 80%, most preferably at least 90% of the cells.

6. Panel according to one of the preceding clauses, wherein a major part of the cells in the foam concrete are of a size which is sufficiently small to absorb water by capillary action.

7. Panel according to one of the preceding clauses, wherein the foam concrete has been obtained by autoclaving a concrete material at high temperature and pressure.

8. Panel according to one of the preceding clauses, wherein the concrete material comprises a mixture of particulate material and a cement as a binder, wherein the cement is preferably:
calcium based i.e. a mineral compound comprising calcium oxide and/or calcium hydroxide, and/or
calcium silicate based, i.e. a mineral compound comprising calcium oxide and/or calcium hydroxide with silicates in addition.

9. Panel according to clause 8, wherein the cement is a calcium silicate hydrate mineral, such as Tobermorite, i.e. Ca5Si6O16(OH)2.4H2O and/or Ca5Si6(O,OH)18.5H2O.

10. Panel according to clause 8 or 9, wherein the particulate material comprises sand, pulverized fuel ash, fly ash, lime, and/or aluminium oxide powder.

11. Panel according to one of the preceding clauses 8-10, wherein the particulate material comprises cellulose based particles, preferably lignocellulose based particles such as wood particles.

12. Panel according to clause 11, wherein at least a part of the cellulose based particles is formed by fibres.

13. Panel according to one of the preceding clauses, wherein a reinforcement layer is included in the core layer.

14. Panel according to one of the preceding clauses, wherein the core layer comprises at least 50% by weight, preferably in between 50 and 90% by weight, of foam concrete.

15. Panel according to one of the preceding clauses, wherein a waterproof layer is situated between the core layer and the top layer, preferably in the form of a waterproof adhesive that adheres the top onto the core layer.

16. Panel according to one of the preceding clauses, wherein the top layer comprises at least one decorative layer and at least one transparent wear layer covering said decorative layer.

17. Panel according to clause 16, wherein the wear layer has a melting temperature of above 100 degrees Celsius, and the wear layer is preferably made of polyurethane.

18. Panel according to one of the preceding clauses, wherein the panel comprises a backing layer attached to a lower side of the core layer.

19. Panel according to one of the preceding clauses, wherein the panel thickness is between 3 and 10 mm.

20. Panel according to one of the foregoing clauses, wherein the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of another, identical panel, and
at least one first locking element, preferably provided at a distant side of the upward tongue facing away from the upward flank,
and wherein the second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of another, identical panel, and
at least one second locking element adapted for co-action with a first locking element of the other identical panel, said second locking element preferably being provided at the downward flank.

21. Panel according to any of the foregoing clauses, wherein the panel comprises at least one third coupling profile and at least one fourth coupling profile located respectively at a third panel edge and a fourth panel edge, wherein the third coupling profile comprises:
a sideward tongue extending in a direction substantially parallel to the upper side of the panel,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of a second identical panel, said third groove being defined by an upper lip and a lower lip, wherein said lower lip is provided with an upward locking element,
wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel.

22. Panel according to one of the preceding clauses, wherein the core comprises at least one reinforcement layer, such as a textile layer, cellulose layer, a carbon fibre layer and/or a glass fibre layer.

23. Panel according to clause 22, wherein the core comprises at least two foam concrete layers, wherein at least one reinforcement layer is situated in between two foam concrete layers.

24. Panel according to one of the preceding clauses, wherein at least a part of each coupling profile is integrally formed with the core.

25. Panel according to one of the preceding clauses, a decorative top layer is covering only at least a part of the upper side of the core layer, 26. Panel according to one of the preceding clauses, wherein the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank.

27. Panel according to one of the preceding clauses, wherein the printed decorative layer comprises a base layer or film, onto which a decorative image is printed.

28. Decorative covering, in particular a decorative floor covering, decorative ceiling covering, or decorative wall covering, comprising a plurality of interconnected decorative panels according to any of the clauses 1-27.

BRIEF DESCRIPTION OF THE DRAWINGS

The invention will be further explained with reference to the appended figures, wherein.

DESCRIPTION OF THE INVENTION

Figure 1:
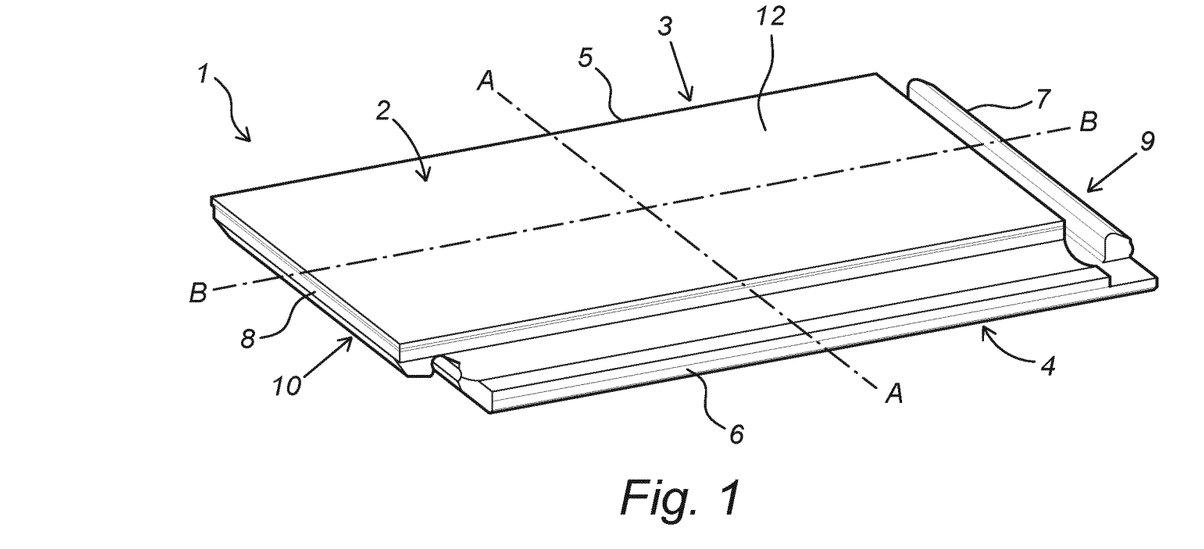
FIG. 1 shows in perspective a panel according to the invention.

FIG. 1 shows a decorative panel 1 which upper side 2 is provided with a decorative top layer 12. The panel is of a rectangular shape having a length extending longitudinally along line B-B, and a width extending transversally along line A-A.

At side edges 9 resp. 10, a first coupling profile 7 resp. a second coupling profile 8 is provided. At side edges 3 resp. 4, a third coupling profile 5, resp. a fourth coupling profile 6 is provided.

Figure 2:
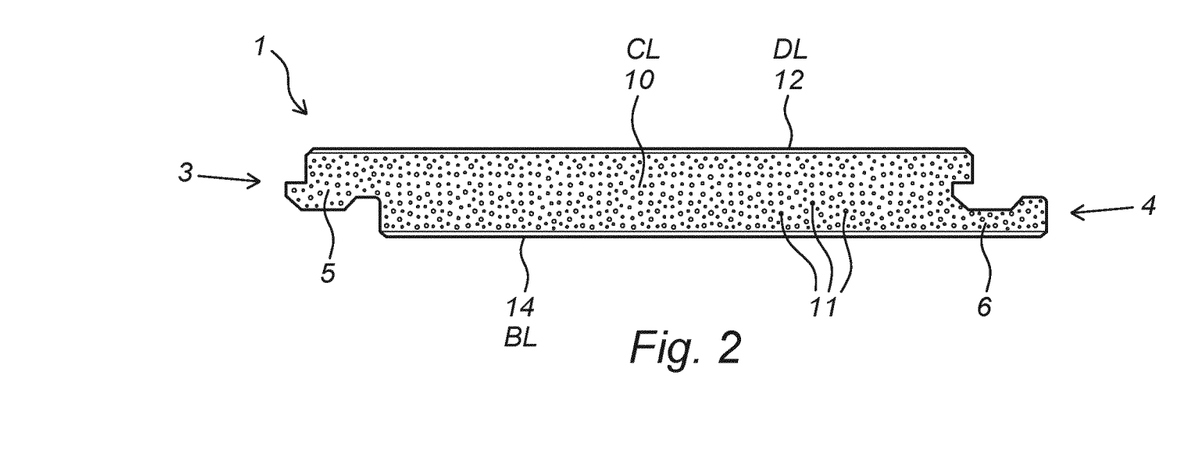
FIG. 2 shows a transversal cross-section of a panel according to the invention.
Figure 3:
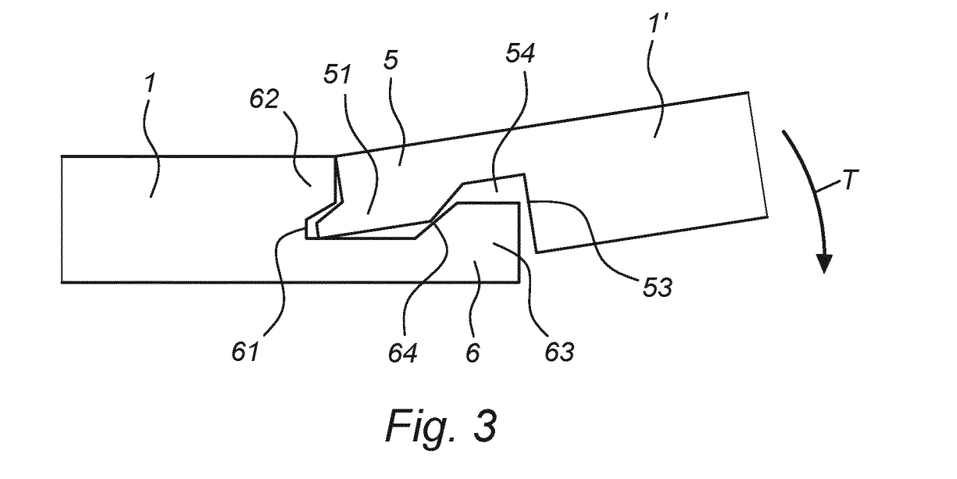
FIGS. 3 and 4 show in transversal cross-section two embodiments of coupling profiles of panels that are interconnected according to the invention.

FIG. 2 shows a transversal cross-section of a panel 1 shown in FIG. 1, along line A-A. The panel 1 has a core layer 10 that is made from a layer of foam concrete, which contains small air bubbles 11 of a closed cell type. Onto the upper side of the foam concrete layer 10 an decorative top layer 12 is adhered, preferably by means of a thin waterproof adhesive layer. Onto the lower side of foam concrete layer 10, a backing layer is adhered. The side edges 3 resp. 4, are provided with a third coupling profile 5, resp. a fourth coupling profile 6. FIG. 3 shows the third and fourth coupling profiles 5 and 6, as depicted in FIG. 2, in detail when connecting two panels 1 and 1' with each other.

The third coupling profile 5 of panel 1', comprises a sideward tongue 51 extending in a direction substantially parallel to the upper side of the panel, one second downward flank 53 lying at a distance from the sideward tongue 51, and a second downward groove 54 formed between the sideward tongue 51 and the second downward flank 53.

The fourth coupling profile 6 of panel 1, comprises a third groove 61 configured for accommodating at least a part of the sideward tongue 51 of the third coupling profile 5 of a second identical panel 1', said third groove 61 being defined by an upper lip 62 and a lower lip 63, wherein said lower lip is provided with an upward locking element 64.

In the situation shown in FIG. 3, the third coupling profile and the fourth coupling profile 6 are configured such that the respective panels 1 and 1', can be coupled to each other by means of a turning movement as indicated by arrow T, which involves the sideward tongue of panel 1' being inserted into the third groove of the other identical panel 1, wherein the upward locking element 64 of the panel 1, is inserted into the second downward groove 54 of the panel 1'.

Figure 4:
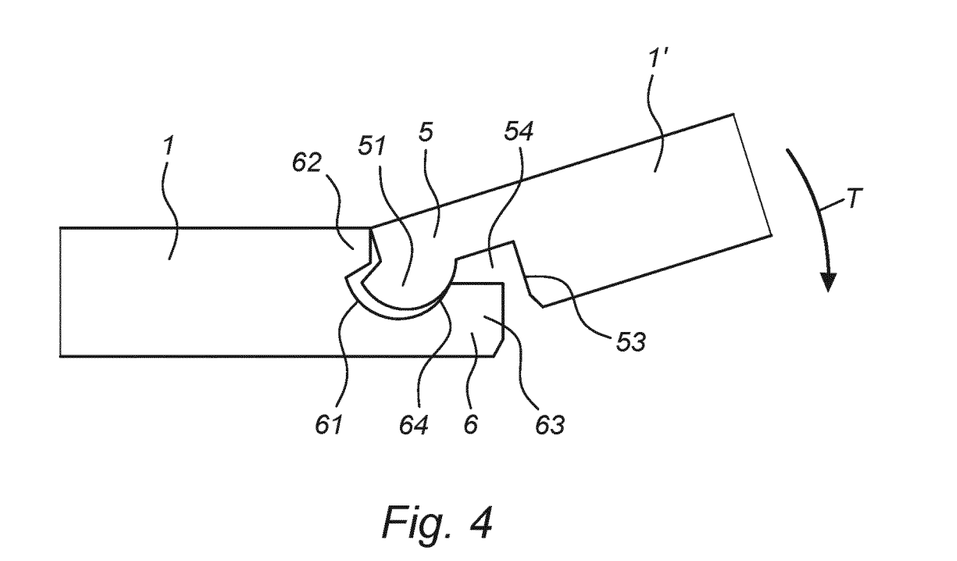

FIG. 4 shows analogously to FIG. 3, a different design of coupling profiles 5 and 6, having rounded features at tongue 51 and at third groove 61. The turning movement for coupling may also be referred to as a hinging movement in this alternative embodiment to FIG. 3. All other functional features and their numerals are the same as already defined for FIG. 3.

Figure 5:
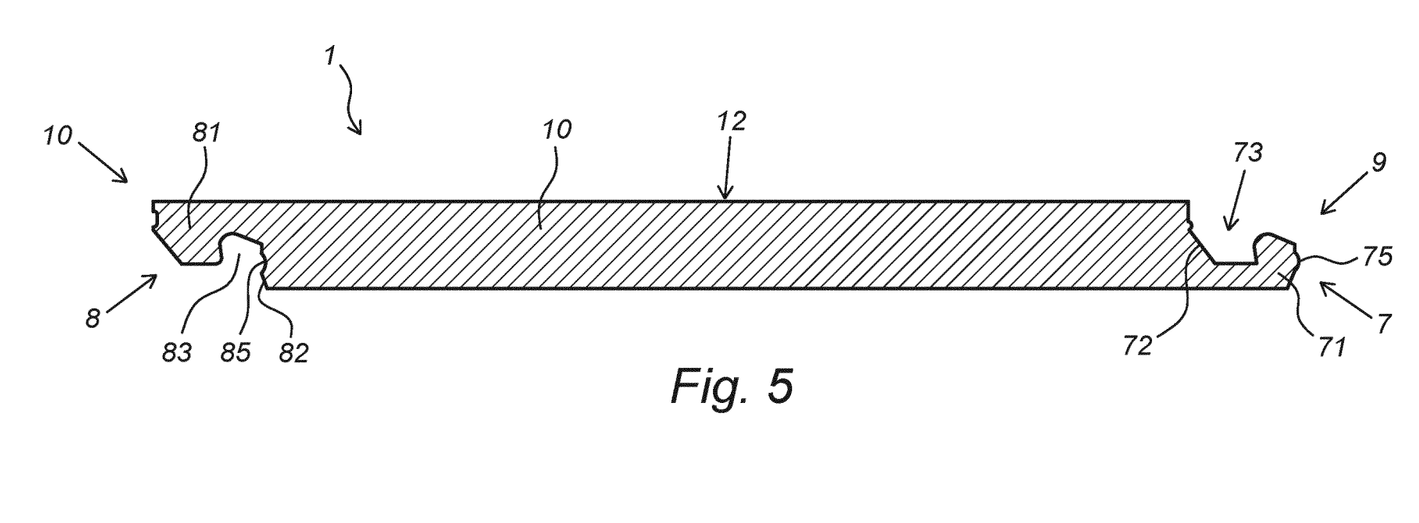
FIG. 5 shows a longitudinal cross-section of a panel according to the invention.

FIG. 5 shows a longitudinal cross-section of a panel 1 shown in FIG. 1, along line B-B. The panel 1 has a core layer 10 that is made from a layer of foam concrete, which contains small air bubbles of a closed cell type. Onto the upper side of the foam concrete layer 10 an decorative top layer 12 is adhered.

At side edges 9 resp. 10, a first coupling profile 7 resp. a second coupling profile 8 is provided.

The first coupling profile 7 comprises an upward tongue 71, an upward flank 72 lying at a distance from the upward tongue 71, an upward groove 73 formed in between the upward tongue 71 and the upward flank 72 wherein the upward groove 73 is adapted to receive at least a part of a downward tongue 81 of a second coupling profile 8 of another, identical panel, and at least one first locking element 75, preferably provided at a distant side of the upward tongue 71 facing away from the upward flank 72.

The second coupling profile 8 comprises a first downward tongue 81, a first downward flank 82 lying at a distance from the downward tongue 81, a first downward groove 83 formed in between the downward tongue 81 and the downward flank 82, wherein the downward groove 83 is adapted to receive at least a part of an upward tongue 71 of a first coupling profile 7 of another, identical panel, and a second locking element 85 adapted for co-action with a first locking element 75 of the other, identical panel, which is provided at the downward flank 82.

Figure 6:
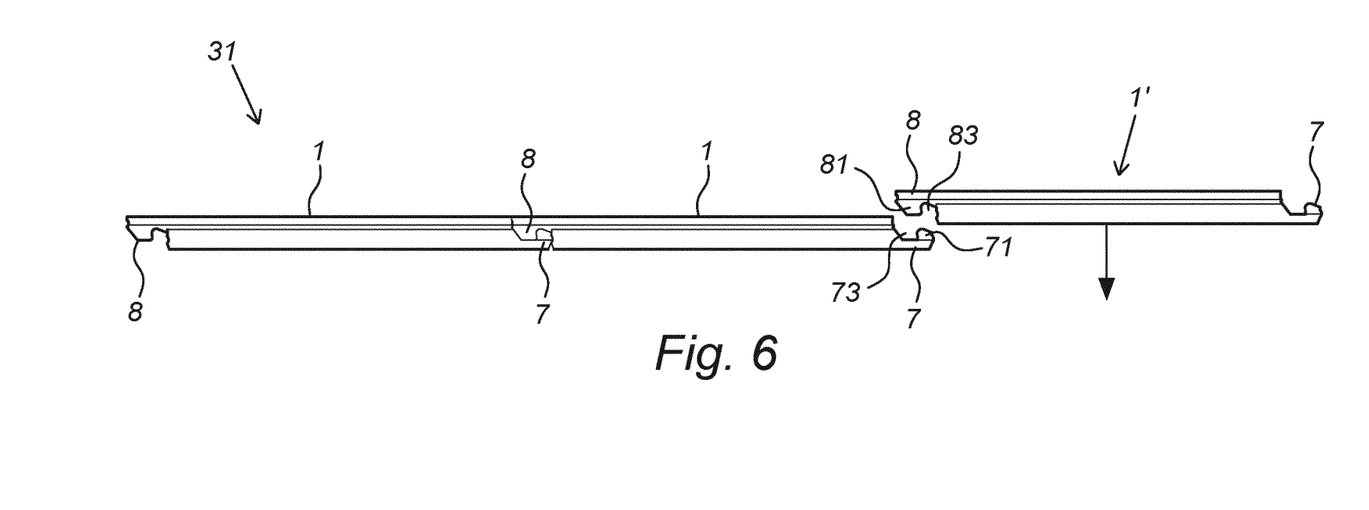
FIG. 6 shows in longitudinal cross-section one embodiment of coupling profiles of panels that are interconnected according to the invention.

FIG. 6 shows how the first and second coupling profiles 7 and 8 of a panel can interact, when connecting the respective profiles 7 and 8 of a panel 1 and a panel 1', depicted at the far left. The panel 1' is hereby moved vertically downwards wherein the profiles 7 and 8 engage with each other by receiving upward tongue 71 in downward groove 83 and receiving downward tongue 81 in upward groove 73.

The invention claimed is:

1. A decorative panel, in particular a floor panel, ceiling panel or wall panel, comprising:
   a core layer having an upper side and a lower side,
   a printed decorative top layer connected, directly or indirectly, to said upper side of the core layer,
   a first panel side edge comprising a first coupling profile, and a second panel side edge comprising a second coupling profile designed to interconnect with a first coupling profile of a second, identical panel, both in horizontal direction and in vertical direction, wherein the first coupling profile comprises:
   an upward tongue,
   at least one upward flank lying at a distance from the upward tongue, an upward groove formed in between the upward tongue and the upward flank wherein the upward groove is adapted to receive at least a part of a downward tongue of a second coupling profile of another, identical panel, and at least one first locking element provided at a distant side of the upward tongue facing away from the upward flank, and wherein the second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of another, identical panel, and at least one second locking element adapted for co-action with a first locking element of the other identical panel, said second locking element being provided at the downward flank, a third panel side edge comprising a third coupling profile, and a fourth panel side edge comprising a fourth coupling profile designed to interconnect with a third coupling profile of a another, identical panel, both in horizontal direction and in vertical direction, wherein the third coupling profile comprises:

a sideward tongue extending in a direction substantially parallel to the upper side of the panel, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of a second identical panel, said third groove being defined by an upper lip and a lower lip, wherein said lower lip is provided with an upward locking element, wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel, wherein the core layer comprises at least one layer of foam concrete which is constituted by a matrix of concrete material in which air pockets in the form of cells are present, wherein the panel thickness is between 3 and 10 mm, wherein the concrete material comprises a particulate material comprising cellulose based particles, wherein the core layer comprises at least one reinforcement layer, wherein the at least one reinforcement layer comprises a textile layer, a cellulose layer, a carbon fibre layer, a glass fibre layer, or a combination thereof, and wherein the core layer comprises at least two foam concrete layers, wherein at least one reinforcement layer is situated in between two foam concrete layers.

2. A panel according to claim 1, being flat and having a rectangular contour, comprising four side edges.

3. The panel according to claim 1, wherein the first and second panel side edges are opposed side edges of the panel.

4. The panel according to claim 1, wherein
either the cells in the foam concrete make up 60 to 85 vol. % of the total volume of the foam concrete, or
the density of the foam concrete is in the range of 400 to 800 kg/m3.

5. The panel according to claim 4, wherein the cells comprise closed cells, wherein at least 80% of the cells are comprised of the closed cells.

6. The panel according to claim 1, wherein the cells in the foam concrete are of a size which is sufficiently small to absorb water by capillary action.

7. The panel according to claim 1, wherein the foam concrete has been obtained by autoclaving a concrete material at high temperature and pressure.

8. The panel according to claim 1, wherein the concrete material comprises a mixture of particulate material and a cement as a binder, wherein the cement is:
calcium based mineral compound comprising calcium oxide and/or calcium hydroxide, and/or
calcium silicate based mineral compound comprising calcium oxide and/or calcium hydroxide with silicates in addition.

9. The panel according to claim 8, wherein the cement is a calcium silicate hydrate mineral comprising $Ca_5Si_6O_{16}(OH)_2 \cdot 4H_2O$ and/or $Ca_5Si_6(O,OH)_{18} \cdot 5H_2O$.

10. The panel according to claim 8, wherein the particulate material comprises
sand, pulverized fuel ash, fly ash, lime, and/or aluminium oxide powder.

11. The panel according to claim 1, wherein the particulate material comprises lignocellulose based particles or wood particles.

12. The panel according to claim 1, wherein at least a part of the cellulose based particles is formed by fibres.

13. The panel according to claim 1, wherein the core layer comprises at least 50% by weight of foam concrete.

14. The panel according to claim 1, wherein a waterproof layer is situated between the core layer and the top layer, in the form of a waterproof adhesive that adheres the top onto the core layer.

15. The panel according to claim 1, wherein the top layer comprises at least one decorative layer and at least one transparent wear layer covering said decorative layer.

16. The panel according to claim 15, wherein the wear layer has a melting temperature of above 100 degrees Celsius, and the wear layer is made of polyurethane.

17. The panel according to claim 1, wherein the panel comprises a backing layer attached to a lower side of the core layer.

18. The panel according to claim 1, wherein at least a part of each coupling profile is integrally formed with the core.

19. The panel according to claim 1, wherein the printed decorative top layer is covering only at least a part of the upper side of the core layer.

20. The panel according to claim 1, wherein the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank.

21. The panel according to claim 1, wherein the printed decorative layer comprises a base layer or film, onto which a decorative image is printed.

22. A decorative covering, in particular a decorative floor covering, decorative ceiling covering, or decorative wall covering, comprising a plurality of interconnected decorative panels according to claim 1.

\* \* \* \* \*